J. McD. HATTERSLEY.
WASHING DEVICE.
APPLICATION FILED JUNE 7, 1915.
1,163,533.
Patented Dec. 7, 1915.
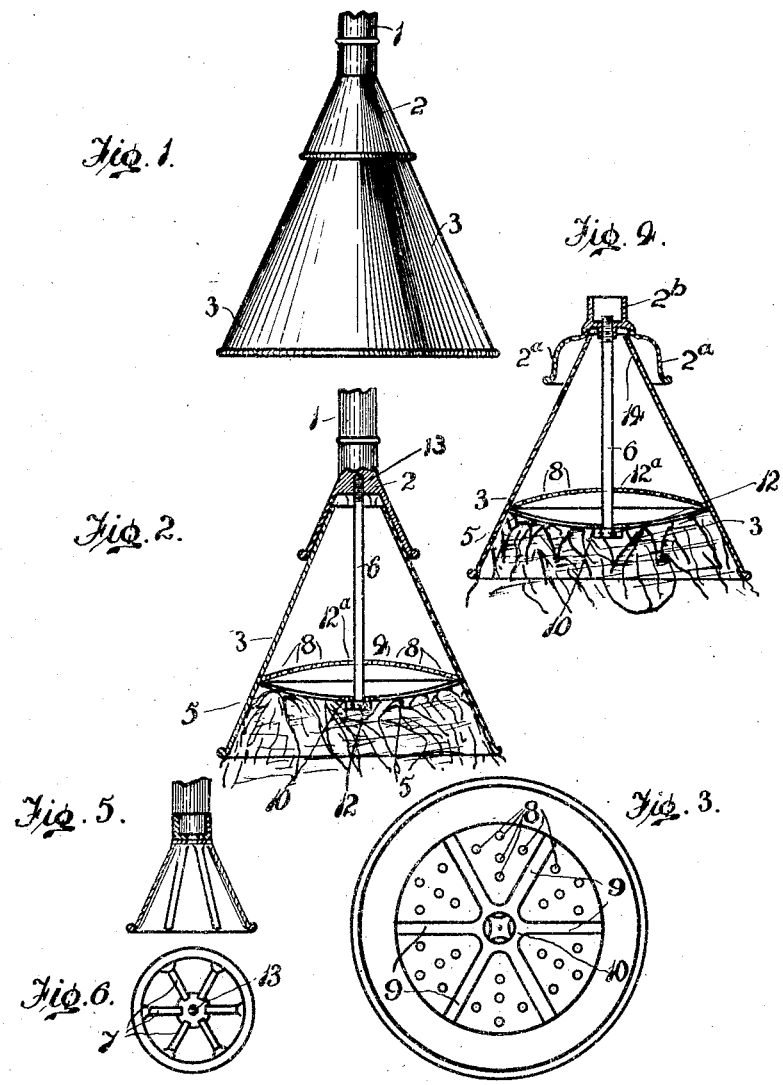

UNITED STATES PATENT OFFICE.

JOHN McDONALD HATTERSLEY, OF LONDON, ENGLAND.

WASHING DEVICE.

1,163,533. Specification of Letters Patent. Patented Dec. 7, 1915.

Application filed June 7, 1915. Serial No. 32,676.

*To all whom it may concern:*

Be it known that I, JOHN MCDONALD HATTERSLEY, a subject of the King of Great Britain and Ireland, residing at 203 Regent street, London, W., England, have invented certain new and useful Improvements in Washing Devices; and I do hereby declare the following to be a full, clear, and exact description of the invention, such as will enable others skilled in the art to which it appertains to make and use the same.

This invention relates to an improved device for washing clothes and the like and has for its object to produce a device which will have many advantages in manufacture, packing and handling and which will be more efficient in use than those at present employed.

My device comprises a cone having a handle attached to the smaller end and fitted with a perforated diaphragm near its open end and provided with means to prevent the clothes from coming into direct contact with the said diaphragm.

The parts of my improved washer are preferably so constructed and attached to each other that the whole device can be disassembled by unscrewing a single nut or screw forming part of or attached to a central rod.

In order that my invention may be more clearly understood and more readily carried into practice I have appended hereunto a sheet of drawings illustrating the same wherein—

Figure 1 is an elevation of a device made in accordance with my invention. Fig. 2 is a sectional view. Fig. 3 is an underside plan. Fig. 4 is a sectional view illustrating a modification. Figs. 5 and 6 are sectional elevation and underside plan respectively of a modified form of socket portion.

In carrying my invention into practice as illustrated in the accompanying drawings at Figs. 1, 2, 3, 5 and 6 the handle 1 of the device is secured to a socket portion 2 having a conical mouth at its lower end, which receives the small end of the main conical body 3 of the tool, the perforated diaphragm or diaphragms 4 and 5 detachably fit within the mouth of the main cone, all being secured together by a central screw 6 or equivalent.

The socket portion 2 may be conveniently made from a gun-metal or other non-oxidizable material, having an opening at its upper end to receive the wooden handle 1, and having a conical opening at the lower end to receive the narrow end of the main conical member, which is truncated and open at this truncated end. The socket portion is made with a series of ribs 7 disposed radially upon its interior, or the truncated cone may have similar external ribs, so that when the two parts are placed together they contact only at the projecting ribs, the main parts being slightly separated so as to permit the water to pass up through the main cone and out between the said cone and the lower part of the socket portion, which thus forms a shield to protect the operator from splashes.

Two diaphragms are employed one of which 4 is perforated with small holes 8, and which is preferably dished and placed within the mouth of the cone, having its concave surface facing in the direction of the mouth of the cone, while the other disk 5 has a series of radial arms 9 projecting outwardly from a central boss portion 10, this diaphragm being preferably similarly dished, but placed within the cone in the opposite way, *i. e.*, with its convex surface facing toward the mouth of the cone, so that although the two disks contact together at their outer peripheries, they are separated to a considerable extent at the center. Each of these two disks has a central hole, 12 12$^a$ through which is passed the long screw 6, which engages with a small screwed hole 13 in the socket portion this single screw clamping the two diaphragms and the main cone and the socket all together, and obviously by removing the screw the two diaphragms and the main cone and the socket may be disconnected for cleaning purposes.

At Fig. 4 a form is illustrated according to which the shield portion 2$^a$ is of sheet metal and is made separately from the socket portion 2$^b$ of the socket member. In this form no internal ribs are provided but the water is allowed to pass out through the holes 14 formed under the shield in the cone 3. As in the other forms shown it will be seen that all the parts are readily detachable by removing the screw 6 or the like.

Figs. 5 and 6 illustrate a slightly modified form of socket member 2 which is made in two parts as shown adapted to be clamped together by the central screw 6. These figures also serve to illustrate clearly the ribs 7 which are employed in this construction described with reference to Figs. 1 to 3.

It will be understood that the device is used by reciprocating it up and down in the wash tub, the clothes or other articles being washed occupying positions within and underneath the cone and underneath the diaphragm 5 as shown in Figs. 2 and 4.

In my apparatus no part is permanently attached thereto or to any other part except the central rod, this may be attached either to the handle socket or to the lower disk or diaphragm 5 as hereinbefore described or it may not be attached to either. In any case it will be observed that all the component parts of my machine can be separated from one another by the simple operation of unscrewing or unfastening one small part.

The advantages obtained by constructing the device so that all parts are readily detachable, are that each part can be cleaned and dried separately with great ease, a number of the cones and other parts can be packed within the other enabling me to obtain great economy of space when the device is packed for transit or other purposes, the device can be manufactured more cheaply than has hitherto been the case owing to the fact that the hand labor required is reduced to a minimum, and moreover if any part has to be replaced from any cause this can be done with great facility.

A most important feature of my invention is the provision of means whereby the clothes are prevented from coming into too close contact with the diaphragm 4 the said means also serving to prevent the clothes or the like entering too far into the whole cone or vessel. If the clothes were allowed to come into close contact with the perforated disk 4 the disturbance of the water caused by these perforations which is essential to efficiency in this class of washing device would be greatly reduced or altogether lost.

Another important feature of my invention is the provision of passages through the upper or smaller end of the main cone, or between same and the handle socket. The presence of these passages allows the device to be moved downwardly upon the clothes with much less effort than is usual as the water enters the lower end of the main cone more readily than is usual owing to the fact that the air within the cone is able to effect a quick exit through said passages. Moreover upon the upward stroke a fresh supply of air enters immediately and the water present in the vessel is thus released again reducing the amount of effort required.

The two diaphragms or disks 4 and 5 will promote an even distribution of soap or other desired substance used in washing and this advantage will be quickly noticed in the rinsing out of the clothes for owing to the greater disturbance of the water which has taken place every particle of the soap or other matter is easily extracted from the clothes with very beneficial results.

While I have herein shown and described my invention generally, it will be readily understood that changes and modifications therein may be required or desired to meet the various exigencies of use, and I desire it to be understood that I reserve the right to make any and all such changes as may be required or found desirable in so far as the same may fall within the spirit and scope of the invention as expressed in the accompanying claims.

What I claim and desire to secure by Letters Patent is:—

1. A clothes washer comprising in combination a cone having an internal perforated inwardly dished diaphragm, and attaching near the inner surface of the cone near the mouth of the cone, and an outwardly dished device comprising a central boss with radial arms and detachably secured near the mouth of the cone immediately outside of the diaphragm whereby the diaphragm is normally held in position.

2. A clothes washer comprising in combination, a cone having through passages near its smaller end a socket portion fitting around the small end of the cone, an internal perforated diaphragm detachably secured near the mouth of said cone, an outwardly dished device comprising a central boss with radial arms detachably secured near the mouth of said cone, and a central rod carried by said socket portion and detachably connecting said cone, said diaphragm, and said device to said socket portion whereby said cone is also detachably secured to said socket portion.

3. A clothes washer comprising in combination a cone having through passages near its smaller end a socket portion fitting around the small end of the cone projecting ribs between said portion and said cone, an internal perforated diaphragm detachably secured near the mouth of said cone and in contact with the inner face thereof, an outwardly dished device comprising a central boss with radial arms secured near the mouth of said cone, the arms of said device contacting with the inner face of the cone immediately in front of said diaphragm whereby the diaphragm is held in place by the device, and a central rod detachably associated with said socket portion and said device.

In testimony whereof I affix my signature, in presence of two witnesses.

JOHN McDONALD HATTERSLEY.

Witnesses:
G. V. SYMES.
S. HART.